(12) United States Patent
Chang et al.

(10) Patent No.: US 9,701,355 B2
(45) Date of Patent: Jul. 11, 2017

(54) REMOTELY ACTUATED VEHICLE FOOT REST

(71) Applicant: Gogoro Inc., Hong Kong (CN)

(72) Inventors: Chia-Hao Chang, New Taipei (TW); Shyh-Yi Kuo, Yangmei (TW); Hok-Sum Horace Luke, Mercer Island, WA (US)

(73) Assignee: Gogoro Inc., Hong Kong (CN)

( * ) Notice: Subject to any disclaimer, the term of this patent is extended or adjusted under 35 U.S.C. 154(b) by 0 days.

(21) Appl. No.: 14/808,207

(22) Filed: Jul. 24, 2015

(65) Prior Publication Data

US 2016/0023706 A1 Jan. 28, 2016

Related U.S. Application Data

(60) Provisional application No. 62/047,407, filed on Sep. 8, 2014, provisional application No. 62/029,224, filed on Jul. 25, 2014.

(51) Int. Cl.
*B62J 25/00* (2006.01)

(52) U.S. Cl.
CPC ..................... *B62J 25/00* (2013.01)

(58) Field of Classification Search
CPC .......................... B62J 25/00; Y10T 74/20918
See application file for complete search history.

(56) References Cited

U.S. PATENT DOCUMENTS

| | | | | |
|---|---|---|---|---|
| 4,030,561 A | | 6/1977 | Hashimoto et al. | |
| 4,591,179 A | * | 5/1986 | Nakamura | B62J 25/00 280/291 |
| 4,988,114 A | * | 1/1991 | Thornton, Jr. | A61G 5/12 280/304.1 |
| 5,979,269 A | * | 11/1999 | Su-Chen | B62J 25/00 280/291 |
| 5,997,023 A | | 12/1999 | Sauter | |
| 6,006,849 A | * | 12/1999 | Watkins | B62H 1/12 180/209 |

(Continued)

FOREIGN PATENT DOCUMENTS

| | | |
|---|---|---|
| CN | 2584489 Y | 11/2003 |
| CN | 103538661 A | 1/2014 |

(Continued)

OTHER PUBLICATIONS

International Search Report and Written Opinion mailed Mar. 17, 2016, for International Application No. PCT/US2015/042080, 16 pages.

*Primary Examiner* — Darlene P Condra
(74) *Attorney, Agent, or Firm* — Perkins Coie LLP (57) ABSTRACT

An actuatable foot rest system includes a foot rest member pivotably displaceable between a first position to a second position. The actuatable foot rest system may also include a biasing member that biases the foot rest member about the at least one pivotable connection, at least from the first position to the second position. The actuatable foot rest system may further include a remotely actuated retention mechanism that includes an actuator disposed remote from the foot rest member and which maintains the foot rest member in the first position and, when remotely actuated using the actuator, releases the foot rest member from the first position.

25 Claims, 4 Drawing Sheets

(56) References Cited

U.S. PATENT DOCUMENTS

| | | | | |
|---|---|---|---|---|
| 6,155,586 | A * | 12/2000 | Melgarejo | A61G 5/12 280/291 |
| 6,339,972 | B1 * | 1/2002 | Paris | B62J 25/00 280/291 |
| 7,021,175 | B1 * | 4/2006 | Xie | B62M 3/086 74/594.4 |
| 7,104,157 | B1 * | 9/2006 | Hilliard | B62J 25/00 280/291 |
| 7,287,773 | B1 * | 10/2007 | Stahel | B62J 25/00 280/288.4 |
| 7,404,586 | B2 * | 7/2008 | Seiberling | B60J 7/067 296/100.09 |
| 7,431,118 | B1 * | 10/2008 | Hogg | B62J 25/00 180/219 |
| 7,757,583 | B1 * | 7/2010 | Reading | B62J 25/00 74/564 |
| 7,823,900 | B2 | 11/2010 | Warren | |
| 8,181,982 | B1 * | 5/2012 | Ward | B62J 25/00 280/163 |
| 8,827,294 | B1 * | 9/2014 | Leitner | 280/166 |
| 9,027,678 | B1 * | 5/2015 | Morris | A61G 5/04 180/22 |
| 2004/0140646 | A1 * | 7/2004 | Gorman | B62J 25/00 280/291 |
| 2004/0200312 | A1 * | 10/2004 | Buckhouse | B62J 25/00 74/564 |
| 2005/0012300 | A1 * | 1/2005 | Egan | B62J 25/00 280/291 |
| 2006/0103108 | A1 * | 5/2006 | Hunwardsen | B62J 25/00 280/291 |
| 2007/0057484 | A1 * | 3/2007 | Gilman | B62J 25/00 280/291 |
| 2008/0029994 | A1 * | 2/2008 | Lytle | B62H 1/12 280/293 |
| 2008/0179859 | A1 * | 7/2008 | Boehmke | B62J 25/00 280/291 |
| 2008/0238032 | A1 * | 10/2008 | Ishikawa | B62J 25/00 280/291 |
| 2010/0127474 | A1 * | 5/2010 | Jans | B62J 25/00 280/291 |
| 2010/0175942 | A1 * | 7/2010 | Griep | B62J 25/00 180/90.6 |
| 2010/0187792 | A1 * | 7/2010 | Warren | B62J 25/00 280/291 |
| 2011/0219911 | A1 * | 9/2011 | Zoumaras | B62J 25/00 74/594.6 |
| 2014/0035246 | A1 * | 2/2014 | Plotnizky | A61G 5/12 280/87.01 |
| 2014/0131131 | A1 * | 5/2014 | Marois | B62J 25/00 180/316 |
| 2014/0300080 | A1 * | 10/2014 | Hyun | B62J 13/00 280/304.3 |

FOREIGN PATENT DOCUMENTS

| | | |
|---|---|---|
| JP | 05-208691 A | 8/1993 |
| JP | 06-286678 A | 10/1994 |

* cited by examiner

REMOTELY ACTUATED VEHICLE FOOT REST

BACKGROUND

Technical Field

The present disclosure generally relates to foot rests used by riders of motor-driven vehicles.

Description of the Related Art

Motor-driven vehicles such as scooters, motorcycles, and all-terrain vehicles (ATVs) typically include a frame that supports the vehicle motor, suspension components attached to the frame, and a seat that enables the vehicle operator and any passengers to straddle the frame while operating the vehicle. Frequently, foot rests are attached to the frame at one or more locations convenient for the vehicle operator to place their feet while operating the vehicle or for passengers to place their feet while riding the vehicle. For vehicle operators, such locations are often proximate vehicle foot controls such as clutch, brake, and gear selector may be positioned proximate such foot rests such that the vehicle operator simply "rocks" or moves their foot on the foot rest to change gears, or operate the clutch or brakes. For vehicle passengers, such locations are generally located rearward of the foot rest position of the vehicle operator.

BRIEF SUMMARY

Passenger foot rests may be attached to the vehicle frame at convenient locations to enable the passenger to rest their feet while the vehicle is in operation. Fixed passenger foot rests (which are ready for use by the passenger at all times) are not needed when only the vehicle operator is on-board and at such times, fixed passenger foot rests may present a tripping hazard or may cause injury to the shins of the unwary who accidently impact a fixed foot rest. Pivotable foot rests provide flexibility to swing the foot rests back toward the vehicle frame when not in use, but typically require the vehicle operator or passenger to deploy the foot rests using a hand or toe to "pop" the foot rest either into a stored or operational position.

Providing the vehicle operator with the ability to remotely deploy and/or retract passenger foot rests provides an elegant solution that enables the vehicle operator to advantageously deploy the foot rests when needed and store the foot rests when not in use. Such a remote foot rest deployment system may include a foot rest member that is either directly pivotably attached to the vehicle frame or suspension or pivotably attached to a foot rest frame member that, in turn, is pivotably attached to the vehicle frame member or suspension. A biasing member such as a spring or torsion rod may be used to bias the foot rest toward the stored position (i.e., aligned with the vehicle frame) or deployed position (i.e., projecting outward from the vehicle frame). The foot rest may be held in at least one of a retracted or deployed position using a remotely actuable device, for example a mechanical actuable device, an electrically actuable device, or an electromechanical actuable device.

The remotely actuable foot rest is generally disposed low on the vehicle, near the rear of the vehicle. The actuator may be mounted in a location high, near the front of the vehicle in a location easily accessible to the vehicle operator. The actuator may also be mounted in a different location that is not near the front of the vehicle, but is remote from the remotely actuable foot rest, e.g., near the vehicle operator's seat or the passenger seat. In any event, the actuator is mounted at a distance from the remotely actuable foot rest.

The actuator may be electrically coupled to the remotely actuable foot rest, for example using one or more conductors or one or more multi-conductor cables. The actuator may be mechanically coupled to the remotely actuable foot rest, for example using one or more caliper cables.

In some implementations, the actuator and the actuable foot rest may be communicably coupled and operated by one or more vehicle controllers. For example, the actuator may provide an input to the vehicle controller and the vehicle controller may control the actuable foot rest. In some instances, one or more input devices may provide a permissive signal input to the vehicle controller to enable the deployment or retraction of the remotely actuable foot rests. For example, one or more sensors may detect the presence of a passenger onboard the vehicle, and provide an input indicative of such to the vehicle controller. Upon receiving an input from the actuator, the controller may also confirm the receipt of the signal from the passenger occupancy sensor prior to deploying the remotely actuable foot rest. In another example, one or more sensors may detect the absence of a passenger onboard the vehicle, and provide an input indicative of such to the vehicle controller. Upon receiving an input from the actuator, the controller may also confirm the receipt of the signal from the passenger occupancy sensor prior to retracting the remotely actuable foot rest.

A foot rest system for use with a motor-driven vehicle may be summarized as including a foot rest member having a first end and a second end, the foot rest member coupled at the first end via at least one pivotable connection to a foot rest frame member, the foot rest frame member attachable to a motor-driven vehicle frame component; wherein the foot rest member is pivotably, displaceable from a first position to a second position, such that the second end of the foot rest member travels through a defined arc measured with respect to a longitudinal axis of the foot rest frame member when the second end transits from the first position to the second position; a biasing member that biases the foot rest member about the at least one pivotable connection from the first position to the second position; and a remotely actuated retention mechanism that includes an actuator disposed remote from the foot rest member and which maintains the foot rest member in the first position and, when remotely actuated using the actuator, releases the foot rest member from the first position.

The first position may be one of either a storage position or an operating position and the second position may be the other of the storage position or the operating position. The motor-driven vehicle frame component may include at least one of: a vehicle frame member or a vehicle suspension member.

The foot rest system may further include a brace member having a first end and a second end; wherein the first end of the brace member is pivotably coupled via a plurality of pivotable connections to a motor-driven vehicle frame component; and wherein the brace member maintains the foot rest member in at least one of the first position or the second position.

The remotely actuated retention mechanism may include a mechanical latching device that maintains the foot rest member in the first position. The remotely actuated retention mechanism may release the mechanical latching device via at least one of: a mechanical release, an electrical release, a magnetic release, or an electromagnetic release. The remotely actuated retention mechanism may include an electromagnetic latching device that maintains the foot rest member in the first position. The defined arc may include a horizontal angle of from about 45° to about 135° measured with respect to the longitudinal axis of the foot rest frame member when the second end transits from the first position to the second position. The defined arc may include a vertical angle of from about 45° to about 135° measured with respect to the longitudinal axis of the foot rest frame member when the second end transits from the first position to the second position. The defined arc may include a horizontal or vertical angle of about 90° measured with respect to the longitudinal axis of the foot rest frame member when the second end transits from the first position to the second position. The remotely actuated retention mechanism may maintain the foot rest in the second position and when remotely actuated using the actuator may cause the foot rest to transition from the second position.

A motor-driven vehicle may be summarized as including a vehicle frame; a vehicle suspension member pivotably coupled to the vehicle frame; vehicle exterior bodywork coupled to at least a portion of the vehicle frame; a foot rest system comprising: a foot rest member, having a first end and a second end, the foot rest member coupled at the first end via at least one pivotable connection to a foot rest frame member, the foot rest frame member attachable to the vehicle frame; wherein the foot rest member is pivotably, displaceable from a first position to a second position, where the second end of the foot rest member travels through a defined arc measured with respect to a longitudinal axis of the vehicle frame when the second end transits from the first position to the second position; a biasing member that biases the foot rest member about the at least one pivotable connection from the first position to the second position; and a remotely actuated retention mechanism that includes an actuator disposed remote from the foot rest member and which maintains the foot rest member in the first position and, when remotely actuated using the actuator, releases the foot rest member from the first position.

The first position may be one of either a storage position or an operating position and the second position may be the other of the storage position or the operating position.

The motor-driven vehicle may further include a cover member operably coupled to the foot rest system such that when the foot rest member is disposed in one of either the first position or the second position, at least a portion of the cover member conforms to an exterior surface of the vehicle exterior bodywork. Alternatively, the foot rest system may further include its own cover such that when the foot rest member is disposed in one of either the first position or the second position, at least a portion of the cover member conforms to an exterior surface of the vehicle exterior bodywork.

The remotely actuated retention mechanism may include a mechanical latching device that maintains the foot rest member in the first position. The remotely actuated retention mechanism may release the mechanical latching device via at least one of: a mechanical release, an electrical release, a magnetic release, or an electromagnetic release. The remotely actuated retention mechanism may include an electromagnetic latching device that maintains the foot rest member in the first position. The defined arc may include a horizontal angle of from about 45° to about 135° measured with respect to the longitudinal axis of the foot rest frame member when the second end transits from the first position to the second position. The defined arc may include a vertical angle of from about 45° to about 135° measured with respect to the longitudinal axis of the foot rest frame member when the second end transits from the first position to the second position. The defined arc may include a horizontal or vertical angle of about 90° measured with respect to the longitudinal axis of the foot rest frame member when the second end transits from the first position to the second position. The remotely actuated retention mechanism may maintain the foot rest in the second position and when remotely actuated using the actuator may cause the foot rest to transition from the second position.

The motor-driven vehicle foot rest system may further include a brace member having a first end and a second end, the first end of the brace member pivotably coupled via a plurality of pivotable connections to a motor-driven vehicle frame component and the second end of the brace member pivotably coupled to the foot rest frame member, wherein the brace member maintains the foot rest member in at least one of the first position or the second position.

A foot rest system for use with a motor-driven vehicle may be summarized as including a foot rest member, having a first end and a second end, the foot rest member coupled at the first end via at least one pivotable connection to a motor-driven vehicle frame component; wherein the foot rest member is pivotably displaceable from a first position to a second position, where the second end of the foot rest member travels through a defined arc measured with respect to a longitudinal axis of the motor-driven vehicle frame component when the second end transits from the first position to the second position; a biasing member that biases the foot rest member about the at least one pivotable connection from the first position to the second position; and a remotely actuated retention mechanism that includes an actuator disposed remote from the foot rest member and which maintains the foot rest member in the first position and, when remotely actuated using the actuator, releases the foot rest member from the first position.

BRIEF DESCRIPTION OF THE SEVERAL
VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with switches, sensors, controllers, and communications systems and structures and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device means any device capable of storing electrical power and releasing stored electrical power including but not limited to batteries, supercapacitors or ultracapacitors. Reference to batteries means chemical storage cell or cells, for instance rechargeable or secondary battery cells including but not limited to nickel cadmium alloy or lithium ion battery cells.

The headings and Abstract of the Disclosure provided herein are for convenience only and do not interpret the scope or meaning of the embodiments.

Figure 1A:
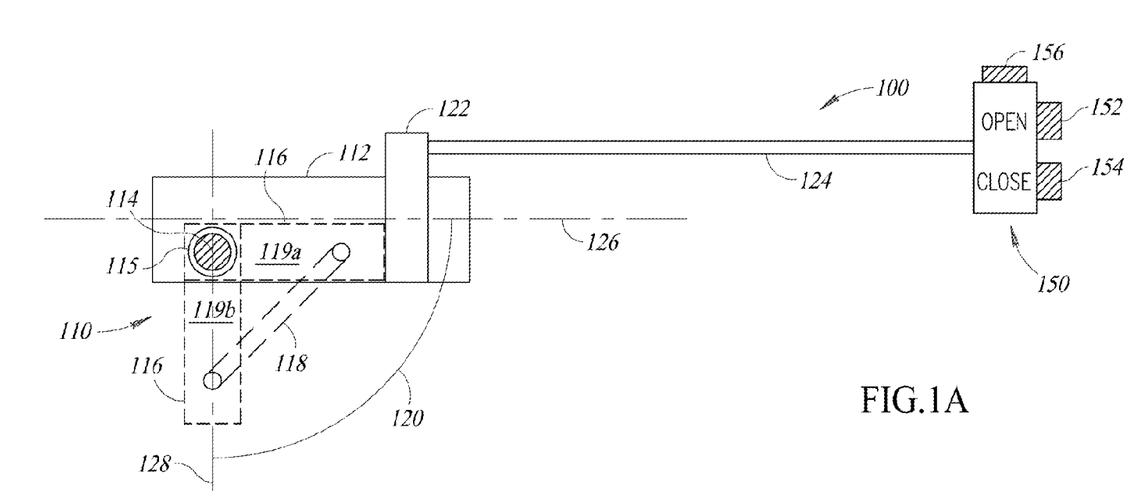
FIG. 1A is a partial plan view of an example remotely actuable foot rest system, according to one non-limiting illustrated embodiment.
Figure 1B:
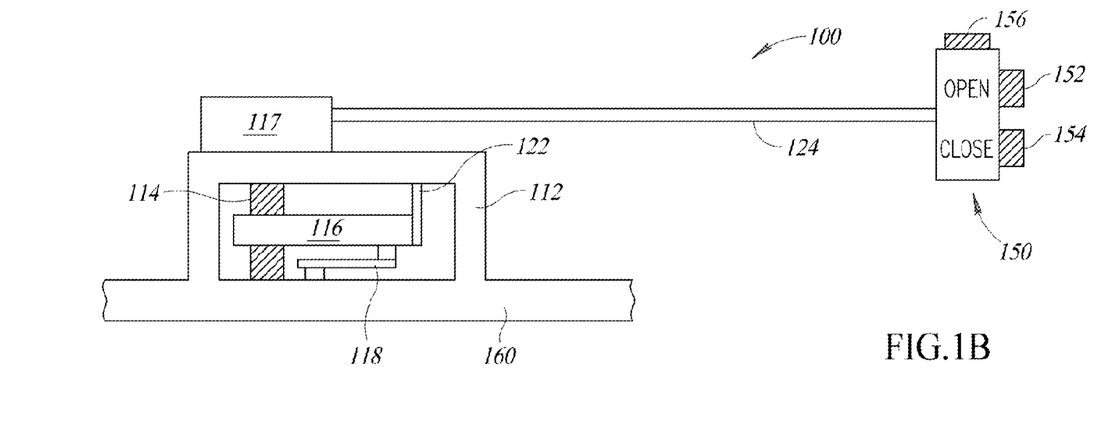
FIG. 1B is a partial elevation view of an example remotely actuable foot rest system according to one non-limiting illustrated embodiment.

FIGS. 1A and 1B show example remotely actuable foot rest system 100 that includes at least one remotely actuable foot rest 110 operably coupled to a remote actuator device 150, according to one illustrated embodiment. A foot rest member 116 portion of the remotely actuable foot rest 110 transitions from a first position 119a to a second position 119b upon activation of the actuator 150. At times, the first position 119a may include a storage position in which the foot rest member 116 is inaccessible to the passenger. Such a first position 119a may include a foot rest member that is generally aligned with the vehicle frame and may be covered by one or more coverings or similar external surfaces (not shown) that accords with the external design and/or bodywork of the motor-driven vehicle. At times, the second position 119b may include a deployed position in which the foot rest member 116 is accessible to the passenger. Such a second position 119b may include a foot rest member that projects outward from the vehicle frame at a defined angle, for example about 90°.

At times, one or more pairs of remotely actuable foot rests 110 and at least one remote actuator device 150 will be mounted on a single motor-driven vehicle. The remotely actuable foot rests 110 may be mounted on opposed lateral sides of the motor-driven vehicle such that a passenger straddling the motor-driven vehicle will have their left foot supported by a first of the pair of remotely actuable foot rests 110 and their right foot supported by a second of the pair of remotely actuable foot rests 110. In such an installation, the operation of both remotely actuable foot rests will be controlled using a single remote actuator device 150 coupled to the motor-driven vehicle in a location convenient for the vehicle operator. For clarity and ease of discussion, the remotely actuable foot rest 110 will be described as a single device, however those of skill in the relevant arts will readily appreciate such remotely actuable foot rests 110 are typically employed in pairs as described above.

The remotely actuable foot rest 110 includes a frame member 112, at least one pivot point 114, a foot rest member 116, and an optional brace 118 between the foot rest member 116 and the frame member 112 that stabilizes or helps to structurally support the foot rest member 116. The foot rest member 116 is pivotably displaceable from a first position 119a to a second position 119b through an arc 120 measured between a longitudinal axis 126 of the frame member 112 and a longitudinal axis 128 of the foot rest member 116. In some implementations, the actuator 150 is electrically conductively coupled 124 to the remotely actuable foot rest 110 using one or more conductors or conductive paths. In some implementations, the actuator 150 is mechanically operably coupled 124 to the remotely actuable foot rest 110. In some implementations the brace 118 may be pivotably or otherwise operably coupled to the foot rest member 116 adjacent the first end of foot rest member 116 and pivotably or otherwise operably coupled to the frame member 112 adjacent the second end of frame member 112 or the vehicle frame 160. In some implementations, in addition to being pivotably coupled to at least one of the foot rest member 116 and the frame member 112, the brace 118 may be slideably, pivotably coupled to at least one of the foot rest member 116 and the frame member 112. Alternatively or in addition, the brace 118 may include a plurality of pivotably coupled members thereby permitting the brace to "scissor" or fold inwardly upon itself, for example when the foot rest member is in the first position 119a.

The frame member 112 can include any system or device capable of pivotably attaching to the foot rest member 116 using at least one pivotable coupling 114 and at least one biasing member 115. The frame member 112 can include one or more brackets, clamps, clips, threaded mounting devices or similar for coupling to a motor-driven vehicle frame or suspension member of a motor-driven vehicle, such as a portable electric energy storage device powered electric scooter. The frame member can include one or more metal, plastic, carbon fiber, or similar components. At times, the frame member 112 is separate from and attachable to one or more vehicle frame components, for example one or more vehicle frame members or one or more motor-driven vehicle suspension members. At other times, as depicted in FIG. 1B, the frame member 112 may be attached, coupled, or integrally formed with one or more motor-driven vehicle frame components 160, for example one or more vehicle frame members or one or more vehicle suspension members.

The foot rest member 116 can include one or more members pivotably attached to the frame member 112 using one or more pivot pins 114 or one or more similar devices permitting the foot rest member 116 to pivot with respect to the frame member 112. Although not shown in FIGS. 1A and 1B, at times, two or more such pivot pins 114 or two or more similar devices permitting the foot rest member 116 to pivot with respect to the frame member 112 may be used. The foot rest member 116 can be made from a metal, metal alloy, or non-metallic composite such as carbon fiber or polymers demonstrating sufficient structural strength, weatherproofness, and resiliency for use as a foot rest. The foot rest member may be a partially or completely solid member or a partially or completely hollow member. The foot rest member system 110 may include one or more additional devices or systems. Such additional devices or systems may include an illumination system that illuminates one or more surfaces of the foot rest member 116 and/or illuminates the region beneath the foot rest member 116. Such additional devices or systems may include a heating system that increases the temperature of the foot rest member, thereby reducing the likelihood of freezing or sticking of the foot rest member 116 in either or both a stored or deployed position. At times, the foot rest member can include a number of telescoping segments that retract to reduce space requirements when in the stored position, but expand to provide an enlarged or extended foot rest when in the deployed position. A non-slip surface treatment may extend partially or completely across the upper surface of the foot rest member 116 that is contacted by the passenger's feet. Such non-slip surface treatments may include one or more rubber pads or coatings, one or more patterns cast into the surface of the foot rest member 116, and/or one or more patterns cut into the surface of the foot rest member 116.

One or more biasing members 115 may be operably coupled to the foot rest member 116. At least one biasing member 115 may be used to bias the foot rest member 116 to the first position 119a. At least one biasing member may be used to bias the foot rest member 116 to the second position 119b. At times, one or more dampeners (not shown) may be used in conjunction with the at least one biasing member 115 to dampen or otherwise slow the movement of the foot rest member 116 caused by the biasing member. Dampening or slowing the deployment or the movement of the foot rest member 116 beneficially decreases the likelihood of injury to the vehicle operator or passenger caused by the movement of the foot rest member 116.

In some implementations, such as that depicted in FIG. 1A, the one or more biasing members 115 may include a coil spring that is disposed about or proximate at least one of the pivot pins 114. A spring biasing member 115 may be used to bias the foot rest member 116 towards the second position 119b (i.e., spring-to-open) or to bias the foot rest member 116 towards the first position 119a (i.e., spring-to-close). One or more mechanical, electrical, or electromechanical latching systems may be used to maintain the foot rest member 116 in the position opposed to the action of the one or more biasing members 115 (i.e., maintain the foot rest member 116 in the closed position 119a with a spring-to-open biasing member 115, or vice-versa).

In other implementations, such as that depicted in FIG. 1B, the one or more biasing members 115 may include an external actuation device 117, for example an electric motor that is operated using a power delivery system carried by the motor-driven vehicle. Such a system advantageously eliminates the need for "latching" the foot rest member 116 in either the first position 119a or the second position 119b since the electric motor can be configured to lock the foot rest member 116 in any desired position.

In some implementations, the external actuation device 117 may include an electrically operated motor such as a stepper motor capable of providing a defined rotational output. In some implementations, the speed of deployment and/or retraction of the foot rest member 116 may be performed at a uniform speed by driving the stepper motor 117 at a defined shaft output speed. In other implementations, the speed of deployment and/or retraction of the foot rest member 116 may be performed at a non-uniform speed, thus for example the deployment and/or retraction of the foot rest member 116 may commence at a lower speed, transition to a higher speed, and conclude at the lower speed. In yet other examples, the deployment and/or retraction of the foot rest member 116 may commence at a lower speed and conclude at a higher speed or commence at a higher speed and conclude at a lower speed. Such a non-uniform motion advantageously provides a distinct look and feel to the deployment and/or retraction of the foot rest members 116 that includes no abrupt motion.

The remotely actuated retention device 122 maintains the foot rest member 116 in the first position 119a and/or the second position 119b using one or more mechanical, electrical, or electromechanical retention systems. In some implementations, the remotely actuated retention device 122 may include a mechanical latch such as a hook, a pin, a pivotable latch, extendible pin or similar. In such implementations, the actuator 150 can cause a physical displacement of the mechanical device sufficient to release the foot rest member 116, thereby permitting the foot rest member 116 to transition from the first position 119a to the second position 119b or vice-versa. In instances where the remotely actuated retention device 122 includes a mechanical latch, the actuator 150 may be operably coupled 124 to the remotely actuated retention device 122 via one or more cables, calipers, mechanical linkages, or similar.

In some implementations, the remotely actuated retention device 122 may include an electrically or electromechanically operated latch such as a solenoid or similar device that is used to drive and/or displace a hook, a pin, a pivotable latch, extendible pin or similar. In such implementations, the actuator 150 can cause the transmission of electrical power and/or an electrical signal to the electromechanical latching device sufficient to cause a displacement of one or more latching members, thereby permitting the foot rest member 116 to transition from the first position 119a to the second position 119b or vice-versa. In instances where the remotely actuated retention device 122 includes an electrical or electromechanical latch, the actuator 150 may be operably coupled 124 to the remotely actuated retention device 122 via one or more conductors, wireless communication pathways, or similar.

In some implementations, the remotely actuated retention device 122 may include an electromagnetic operated latch such as an electromagnet or similar device that is used magnetically retain the remotely actuated retention device in at least one of the first position 119a or the second position 119b. In such implementations, the actuator 150 can cause the transmission of electrical power and/or an electrical signal to the electromagnetic latching device sufficient to cause a change or alteration in the magnetic field produced by the electromagnetic remotely actuated retention device 122. Such changes in magnetic field permit the foot rest member 116 to transition from the first position 119a to the second position 119b or vice-versa. In instances where the remotely actuated retention device 122 includes an electromagnetic latch, the actuator 150 may be operably coupled 124 to the remotely actuated retention device 122 via one or more conductors, wireless communication pathways, or similar.

The foot rest member 116 transitions from the first position 119a to the second position 119b by rotating through a defined arc 120 about the at least one pivot pin 114. The defined arc 120 may be measured as the arc defined by the angle between the longitudinal centerline 126 of the motor-driven vehicle frame 160 or the frame member 112 and the longitudinal centerline 128 of the foot rest member 116. The defined arc 120 may be about 90 degrees or may be greater (or lesser) than about 90 degrees. For example, the defined arc 120 may fall within the range of from about 45 degrees to about 135 degrees.

The actuator 150 can include any device, system, or combination of systems and/or devices suitable for causing the remotely actuated retention device 122 to change operating states thereby permitting the foot rest member 116 to transition from the first position 119a to the second position 119b or vice versa. In some instances the actuator 150 may include one or more human actuable devices such as levers, switches, push-buttons, or similar. Such human actuable devices may include a device 152 such as a pushbutton to deploy the foot rest members 116 into the second position 119b and/or a device 154 to retract the foot rest members 116 into the first position 119a. The actuator 150 may optionally include one or more indicators 156a, 156b to provide a human perceptible (i.e., audio, visual, tactile, etc.) output that is indicative of the position of the foot rest members 116. Such indicators 156a, 156b advantageously relieve the vehicle operator from having to remove their eyes from the road to determine the position of the foot rest members 116. For example, the actuator 150 may include a RED light emitting diode (LED) indicator to indicate the foot rest members 116 are in the second position 119b and a GREEN LED indicator to indicate the foot rest members 116 are in the first position 119a. In another example, foot rest member position indication may be provided on a motor-driven vehicle control panel that includes additional motor-driven vehicle information (e.g., speed, RPM, battery level, turn signal indicators, and similar).

Figure 2A:
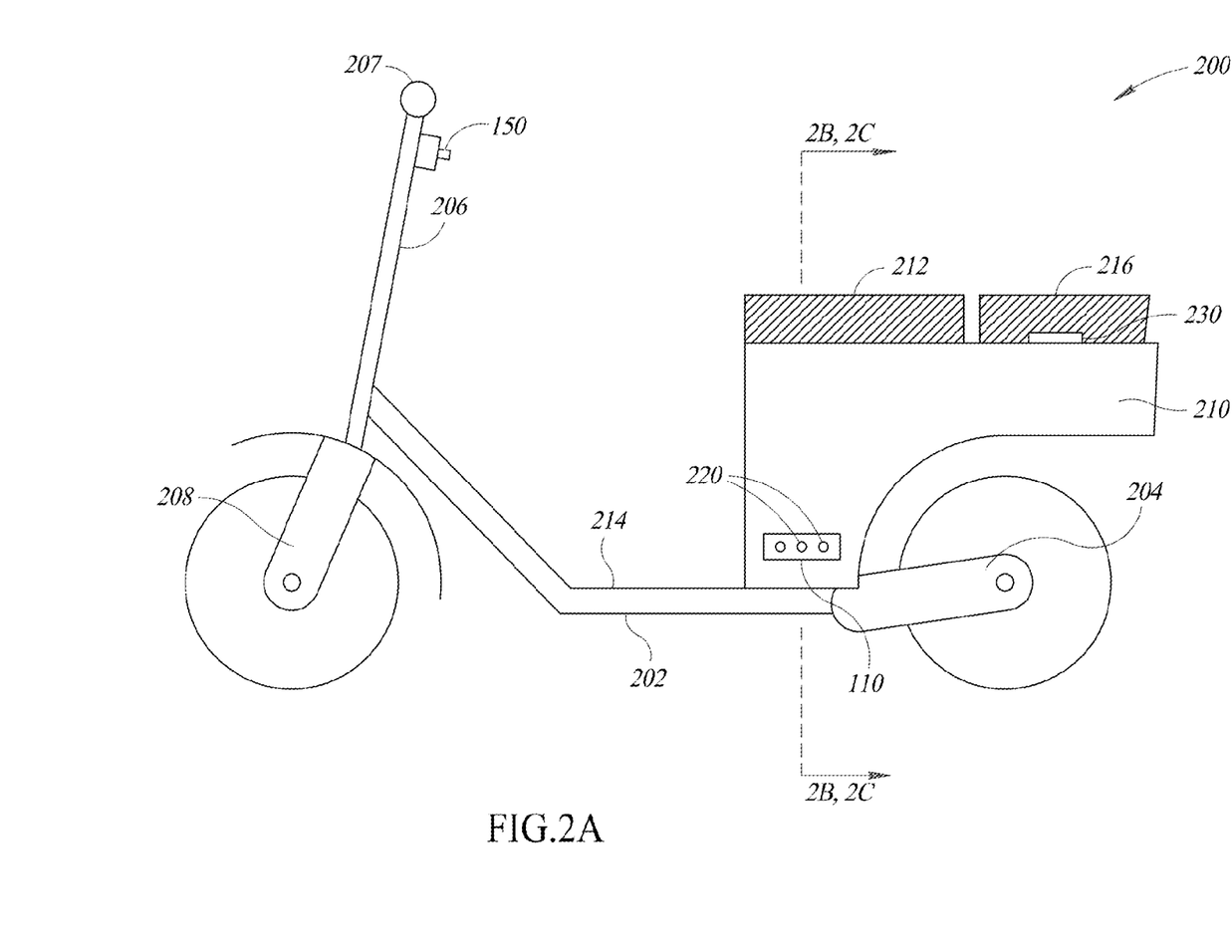
FIG. 2A is a side elevation view of an example two-wheeled, motor-driven vehicle equipped with an actuable foot rest system, according to one non-limiting illustrated embodiment.
Figure 2B:
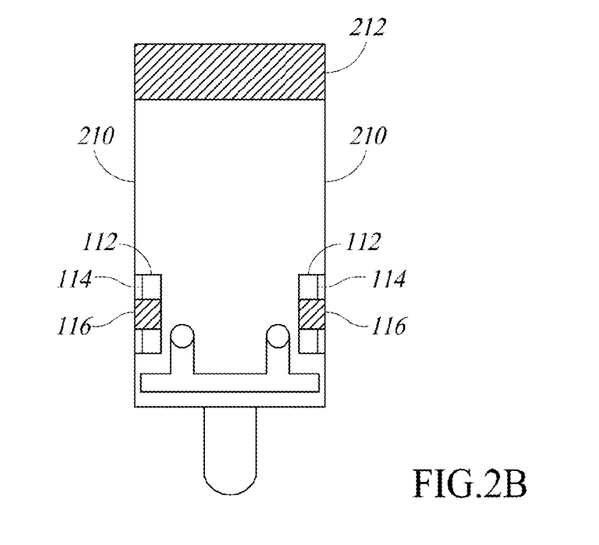
FIG. 2B is a front elevation view of an example two-wheeled, motor-driven vehicle along line 2B-2B equipped with an actuable foot rest system with the foot rest members in a retracted or first position, according to one non-limiting illustrated embodiment.
Figure 2C:
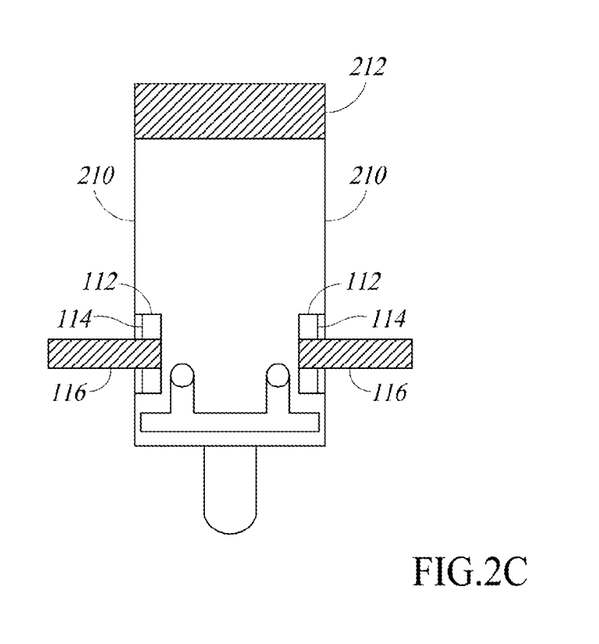
FIG. 2C is a front elevation view of an example two-wheeled, motor-driven scooter equipped along line 2C-2C with an actuable foot rest system with the foot rest members in a deployed or second position, according to one non-limiting illustrated embodiment.

FIG. 2A shows an illustrative side elevation of a two-wheeled, motor-driven vehicle 200 featuring a remotely actuable foot rest system 100 that includes a remotely actuable foot rest 110 and actuator 150, according to one illustrated embodiment. In FIG. 2B, the foot rest members 116 are both depicted in a first (i.e., stored) position 119a in which at least a portion of each of the foot rest members 116 forms a smooth portion of an exterior surface 210 of the motor-driven vehicle 200. In FIG. 2C, the foot rest members 116 are both depicted in a second (i.e., deployed) position 119b in which at least a portion of each of the foot rest members 116 extends or projects from the exterior surface 210 of the motor-driven vehicle 200. The actuator 150 is shown mounted in a location (e.g., proximate the vehicle "handlebars") easily accessible to the motor-driven vehicle operator. The location of the actuator 150 is not limited to the handlebar area of the vehicle. For example, actuator 150 can be located proximate the vehicle operator's seat 212 or the passenger seat 216.

An example motor-driven vehicle 200 may include a two-wheeled scooter or similar vehicle that includes a portable electric energy storage device (i.e., secondary battery) powered electric motor (not shown). In such instances, the motor-driven vehicle 200 may include a frame 202. The frame 202 may include any number of structural components affixed together to provide a rigid frame demonstrative acceptable strength and resiliency. One or more suspension members 204 are detachably attached to the frame 202. A pivotable steering assembly 206 includes handlebars 207 and a front fork 208.

At least a portion of the vehicle is covered by exterior panels 210 which may be structural, decorative, or both. At least some of the exterior panels 210 are affixed to the frame 202. The motor-driven vehicle 200 includes a vehicle operator seating surface 212 and a vehicle deck 214 upon which the vehicle operator may rest their feet when operating the vehicle 200. The motor-driven vehicle 200 also includes a passenger seating surface 216.

The passenger is provided remotely actuable foot rests 110 upon which to rest their feet when the vehicle 200 is in operation. The foot rest members 116 may include a covering, panel, or surface finish that compliments the color, design, and styling of the exterior surfaces 210 of the motor-driven vehicle 200. In such instances, when the foot rest members 116 are in the first (i.e., stored or retracted) position 119a, the covering, panel, or exposed surface finish on the foot rest member 116 forms a portion of the exterior surface of the motor-driven vehicle. By providing a smooth transition between the external surfaces 210 of the motor-driven vehicle 200 and the cover, panel, or exposed surfaces of the foot rest members 116, the design and aesthetic of the motor-driven vehicle 200 is beneficially maintained. In some implementations, the covering panel can be a part of the vehicle components, such as the exterior panels, frame, or suspension members.

In some implementations, one or more optional light emitting devices 220 may be embedded or otherwise incorporated into the foot rest members 116. Some or all of the light emitting devices 220 may be visible when the foot rest members 116 are in the first position 119a and, as such, may provide side marker lights or decorative lights on the motor-driven vehicle 200. Some or all of these light emitting devices 220 may also be visible when the foot rest members 116 are in the second position 119b and, as such, may beneficially assist a passenger on the motor-driven vehicle 200 in locating the foot rest members 116. In some implementations, these optional light emitting devices may be included in vehicle components such as exterior panels, frame or suspension members.

In some instances, one or more sensors 230 capable of detecting the presence of a passenger on the motor-driven vehicle 200 may be used to autonomously or semi-autonomously transition the foot rest members 116 from the first position 119a to the second position 119b. In such instances, a passenger can sit on the motor-driven vehicle 200 and one or more foot rest members 116 automatically deploy. The one or more sensors 230 may include one or more pressure sensors, one or more accelerometers, one or more proximity sensors, one or more stress sensors, one or more thermal sensors, or any other sensor capable of detecting the presence or absence of a passenger on vehicle, or any combination thereof. Where the motor-driven vehicle 200 is equipped with such sensors 230, the actuator 150 may include one or more defeat switches that prevent the automatic deployment of the foot rest members 116, for example when a cargo load is placed on the passenger seat 216 of the motor-driven vehicle. In some instances, when the one or more sensors 230 capable of detecting the presence of a passenger on the motor-driven vehicle 200 detect a passenger has left the motor-driven vehicle 200, the foot rest members 116 may automatically retract to the first position 119a.

Figure 3:
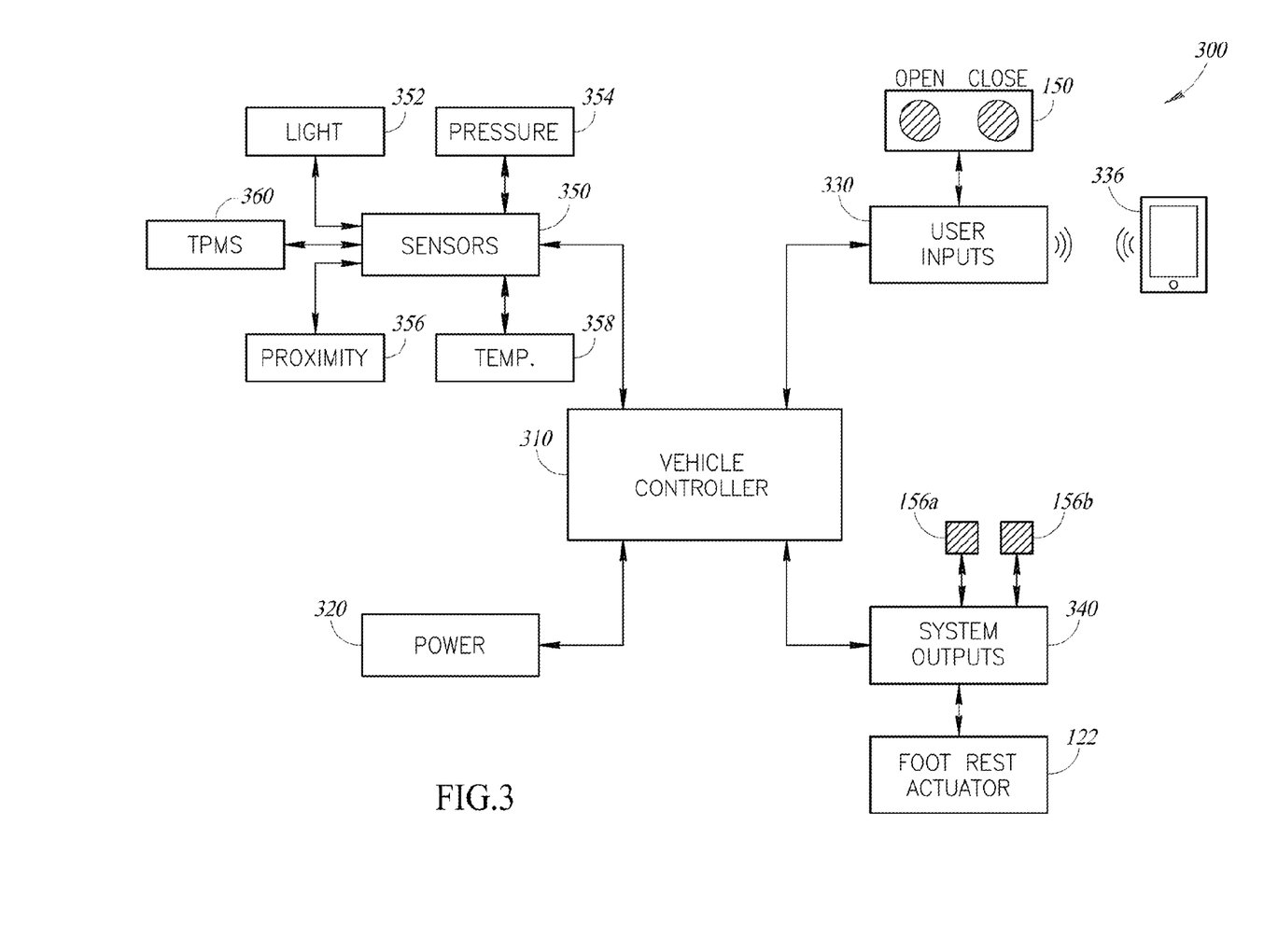
FIG. 3 is a block diagram of an illustrative vehicle control system showing an example actuator input, sensor input, and remotely actuable foot rest, according to one non-limiting illustrated embodiment.

FIG. 3 is a block diagram of an illustrative motor-driven vehicle control system 300 that includes a vehicle controller 310 configured to receive inputs from the vehicle power system 320, vehicle operator 330, and various sensors 350 and provide outputs as a number of system outputs 340, according to one illustrated embodiment. In some implementations, rather than directly control the actuation of the foot rest members 116, the actuator 150 may instead provide one or more user (i.e., vehicle operator) supplied inputs to one or more vehicle control systems or vehicle controllers 310. Integration of the vehicle controller 310 into the foot rest member 116 deployment logic advantageously permits the deployment of the foot rest members 116 based on one or more input signals or permissive signals received by the vehicle controller 310.

The vehicle controller 310 may be communicably coupled with one or more external devices, for example a global positioning system (GPS) receiver having one or more route determination algorithms. In such instances, the vehicle controller may deploy the foot rest members 116 to the second position 119*b* if the controller determines sufficient energy (e.g., fuel or battery capacity) exists to transport the weight of the vehicle operator and a passenger along a route determined by the GPS and route determination algorithms and based at least in part on factors such as elevation changes, weather conditions, road conditions, and traffic. Thus, the deployment of the foot rest members 116 may provide an indication to the vehicle operator that operating the vehicle with the additional weight imposed by a passenger may result in insufficient vehicle range to reach one or more defined destination locations. In another instance, the GPS and route determination algorithm may take into account the loading of the motor-driven vehicle 200 with both an operator and a passenger and may select or determine an alternate route based on road and/or weather conditions (e.g., reroute a heavily loaded vehicle to a route featuring improved surface roads rather than potentially muddy, unimproved roads).

The vehicle controller may communicably couple with one or more handheld communications devices 336 operated by the vehicle operator and/or vehicle passenger. In such instances, the vehicle operator or vehicle passenger may remotely provide an input to the vehicle controller 310 via the handheld communications devices 336 that causes deployment of the foot rest members 116. Non-limiting examples of handheld communications devices include a mobile phone, a key or keyfob for the vehicle, a tablet computer, a wearable computer such as a smartwatch or wristwatch phone device, and the like which can be communicably coupled to the vehicle controller, e.g., via a wireless communication protocol such as WiFi, near field communication, or Bluetooth® standard.

At times, the vehicle controller 310 may retract the foot rest members 116 from the second position 119*b* to the first position 119*a* when the vehicle controller 310 senses one or more defined conditions. For example, the vehicle controller 310 may automatically retract the foot rest members 116 from the second position 119*b* to the first position 119*a* when the vehicle controller 310 "locks" or otherwise prevents the use of one or more vehicular systems or the vehicle itself. In another example, the vehicle controller 310 may automatically retract the foot rest members 116 from the second position 119*b* to the first position 119*a* when the vehicle controller 310 senses the vehicle is unoccupied and in a location (e.g., via GPS coordinates) from which the vehicle departs with only a single vehicle occupant (i.e., the vehicle operator).

At times, the vehicle controller 310 may collect signals from various vehicle sensors, for example an ambient light sensor 352, a pressure sensor 354, a proximity sensor 356, an ambient temperature sensor 358, or a tire pressure monitoring system (TPMS) 360. Inputs from some or all of these sensors 350 may be used by the vehicle controller 310 in determining whether to deploy the foot rest members 116 to the second position 119*b*. For example, based on a signal indicative of an ambient light level around the vehicle 200 as provided by light sensor 352, the vehicle controller 310 may partially or completely illuminate one or more light emitting devices 220 on the foot rest members 116. In another example, based on a signal indicative of tire pressure as provided by TPMS sensor 360, the vehicle controller 310 may prevent the deployment of the foot rest members 116 to the second position 119*b*. In another example, based on a signal indicative of the presence of a passenger on the passenger seat 216 as provided by pressure sensor 354 and/or proximity sensor 356, the vehicle controller may autonomously deploy the foot rest members 116 to the second position 119*b*.

In some instances, the vehicle controller 310 may be communicably coupled to any number of sensors or detectors that are used to deploy the foot rest members 116 from the first position 119*a* to the second position 119*b* and/or retract the foot rest members 116 from the second position 119*b* to the first position 119*a*. For example, the vehicle controller 310 may be communicably coupled to an accelerometer that detects a change in vehicle position or orientation (e.g., when a two wheeled vehicle is moved from a "kickstand" to an upright position) and in response the vehicle controller may cause the deployment of the foot rest members 116. In another example, the vehicle controller 310 may be communicably coupled to a proximity sensor that detects a specific positioning of a vehicle operator's foot or hand or other body part and in response the vehicle controller may cause the deployment of the foot rest members 116. Exemplary proximity sensors include those that rely upon changes or return signals from an electromagnetic field or beam of electromagnetic radiation to detect the presence of an object without physical contact. Other suitable proximity sensors utilize capacitive or photoelectric sensors or inductive sensors. Yet other suitable proximity sensors rely upon contact with the target object. In yet another example, the vehicle controller 310 may automatically cause the deployment of the foot rest members 116 when the vehicle exceeds a defined speed.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. patent application Ser. No. 14/204,857, entitled "APPARATUS, METHOD, AND ARTICLE FOR CHANGING PORTABLE ELECTRICAL POWER STORAGE DEVICE EXCHANGE PLANS" and filed Mar. 11, 2014; U.S. Provisional Patent Application Ser. No. 61/601,949, entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012; U.S. Provisional Patent Application Ser. No. 61/511,900, entitled "APPARATUS, METHOD AND ARTICLE FOR COLLECTION, CHARGING AND DISTRIBUTING POWER STORAGE DEVICES, SUCH AS BATTERIES" and filed Jul. 26, 2011; U.S. Provisional Patent Application Ser. No. 61/511,887, entitled "THERMAL MANAGEMENT OF COMPONENTS IN ELECTRIC MOTOR DRIVE VEHICLES" and filed Jul. 26, 2011; U.S. patent application Ser. No. 14/022,134, entitled "BATTERY AS MEMORY STORAGE/TRANSPORT UNIT" and filed Sep. 9, 2013; U.S. patent application Ser. No. 13/559,038, entitled "APPARATUS, METHOD, AND ARTICLE FOR AUTHENTICATION, SECURITY AND CONTROL OF POWER STORAGE DEVICES SUCH AS BATTERIES" and filed Jul. 26, 2012; U.S. patent application Ser. No. 13/559,010, entitled "APPARATUS, METHOD AND ARTICLE FOR AUTHENTICATION, SECURITY AND CONTROL OF POWER STORAGE DEVICES SUCH AS BATTERIES, BASED ON USER PROFILES" and filed Jul. 26, 2012; U.S. patent application Ser. No. 13/646,320, entitled "DETECTIBLE INDICATION OF AN ELECTRIC MOTOR VEHICLE STANDBY MODE" and filed Oct. 5, 2012; U.S. patent application Ser. No. 13/559,259, entitled "THERMAL MANAGEMENT OF COMPONENTS IN ELECTRIC MOTOR DRIVE VEHICLES" and filed Jul. 26, 2012; and U.S. Provisional Patent Application Ser. No. 61/511,880, entitled "DYNAMICALLY LIMITING VEHICLE OPERATION FOR BEST EFFORT ECONOMY" and filed Jul. 26, 2011; are incorporated herein by reference, in their entirety. Aspects of the embodiments can be modified, if necessary, to employ systems, circuits and concepts of the various patents, applications and publications to provide yet further embodiments.

While generally discussed in the environment and context of collection, charging and distribution of portable electrical energy storage devices for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A foot rest system for use with a motor-driven vehicle, comprising:
    a foot rest member, having a first end and a second end, the foot rest member coupled at the first end via at least one pivotable connection to a foot rest frame member, the foot rest frame member attachable to a motor-driven vehicle frame component;
        wherein the foot rest member is pivotably, displaceable from a first position to a second position, such that the second end of the foot rest member travels through a defined arc measured with respect to a longitudinal axis of the foot rest frame member when the second end transits from the first position to the second position;
    a biasing member that biases the foot rest member about the at least one pivotable connection from the first position to the second position; and
    a remotely actuated retention mechanism that includes an actuator disposed remote from the foot rest member and which maintains the foot rest member in the first position and, when remotely actuated using the actuator, releases the foot rest member from the first position so that a biasing force of the biasing member causes the foot rest member to pivot about the at least one pivotable connection.

2. The foot rest system of claim 1 wherein the first position is one of either a storage position or an operating position and the second position is the other of the storage position or the operating position.

3. The foot rest system of claim 1 wherein the motor-driven vehicle frame component comprises at least one of: a vehicle frame member or a vehicle suspension member.

4. The foot rest system of claim 1 wherein the remotely actuated retention mechanism comprises a mechanical latching device that maintains the foot rest member in the first position.

5. The foot rest system of claim 4 wherein the remotely actuated retention mechanism releases the mechanical latching device via at least one of: a mechanical release, an electrical release, a magnetic release, or an electromagnetic release.

6. The foot rest system of claim 1 wherein the remotely actuated retention mechanism comprises an electromagnetic latching device that maintains the foot rest member in the first position.

7. The foot rest system of claim 1 wherein the defined arc comprises a horizontal angle of from about 45° to about 135° measured with respect to the longitudinal axis of the foot rest frame member when the second end transits from the first position to the second position.

8. The foot rest system of claim 1 wherein the defined arc comprises a vertical angle of from about 45° to about 135° measured with respect to the longitudinal axis of the foot rest frame member when the second end transits from the first position to the second position.

9. The foot rest system of claim 1 wherein the defined arc comprises a horizontal angle of about 90° measured with respect to the longitudinal axis of the foot rest frame member when the second end transits from the first position to the second position.

10. The foot rest system of claim 1 wherein the remotely actuated retention mechanism maintains the foot rest in the second position and when remotely actuated using the actuator causes the foot rest to transition from the second position.

11. The foot rest system of claim 1 wherein the remotely actuated mechanism further comprises:
a latching device coupled to the foot rest member and operably coupled to the actuator which, when actuated, causes the latching device to disengage the foot rest member, the biasing member urging the foot rest member from the first position to the second position.

12. A motor-driven vehicle comprising:
a vehicle frame;
a vehicle suspension member pivotably coupled to the vehicle frame;
vehicle exterior bodywork coupled to at least a portion of the vehicle frame;
a foot rest system comprising:
a foot rest member, having a first end and a second end, the foot rest member coupled at the first end via at least one pivotable connection to a foot rest frame member, the foot rest frame member attachable to the vehicle frame;
wherein the foot rest member is pivotably, displaceable from a first position to a second position, where the second end of the foot rest member travels through a defined arc measured with respect to a longitudinal axis of the vehicle frame when the second end transits from the first position to the second position;
a biasing member that biases the foot rest member about the at least one pivotable connection from the first position to the second position; and
a remotely actuated retention mechanism that includes an actuator disposed remote from the foot rest member and which maintains the foot rest member in the first position and, when remotely actuated using the actuator, releases the foot rest member from the first position so that a biasing force of the biasing member causes the foot rest member to pivot about the at least one pivotable connection.

13. The motor-driven vehicle of claim 12 wherein the first position is one of either a storage position or an operating position and the second position is the other of the storage position or the operating position.

14. The motor-driven vehicle of claim 12 further comprising a cover member operably coupled to the foot rest system such that when the foot rest member is disposed in one of either the first position or the second position, at least a portion of the cover member conforms to an exterior surface of the vehicle exterior bodywork.

15. The motor-driven vehicle of claim 14 wherein the remotely actuated retention mechanism comprises a mechanical latching device that maintains the foot rest member in the first position.

16. The motor-driven vehicle of claim 15 wherein the remotely actuated retention mechanism releases the mechanical latching device via at least one of: a mechanical release, an electrical release, a magnetic release, or an electromagnetic release.

17. The motor-driven vehicle of claim 12 wherein the remotely actuated retention mechanism comprises an electromagnetic latching device that maintains the foot rest member in the first position.

18. The motor-driven vehicle of claim 12 wherein the defined arc comprises a horizontal angle of from about 45° to about 135° measured with respect to the longitudinal axis of the foot rest frame member when the second end transits from the first position to the second position.

19. The motor-driven vehicle of claim 12 wherein the defined arc comprises a vertical angle of from about 45° to about 135° measured with respect to the longitudinal axis of the foot rest frame member when the second end transits from the first position to the second position.

20. The motor-driven vehicle of claim 12 wherein the defined arc comprises a horizontal angle of about 90° measured with respect to the longitudinal axis of the foot rest frame member when the second end transits from the first position to the second position.

21. The motor-driven vehicle of claim 12 wherein the remotely actuated retention mechanism maintains the foot rest in the second position and when remotely actuated using the actuator causes the foot rest to transition from the second position.

22. A foot rest system for use with a motor-driven vehicle, comprising:
a foot rest member, having a first end and a second end, the foot rest member coupled at the first end via at least one pivotable connection to a foot rest frame member, the foot rest frame member attachable to a motor-driven vehicle frame component;
wherein the foot rest member is pivotably, displaceable from a first position to a second position, such that the second end of the foot rest member travels through a defined arc measured with respect to a longitudinal axis of the foot rest frame member when the second end transits from the first position to the second position;
a biasing member that biases the foot rest member about the at least one pivotable connection from the first position to the second position;
a remotely actuated retention mechanism that includes an actuator disposed remote from the foot rest member and which maintains the foot rest member in the first position and, when remotely actuated using the actuator, releases the foot rest member from the first position; and a brace member having a first end and a second end;
   wherein the first end of the brace member is pivotably coupled via at least one pivotable brace connection to the motor-driven vehicle frame component; and
   wherein the brace member maintains the foot rest member in at least one of the first position or the second position.

23. A motor-driven vehicle comprising:
a vehicle frame;
a vehicle suspension member pivotably coupled to the vehicle frame;
vehicle exterior bodywork coupled to at least a portion of the vehicle frame;
a foot rest system comprising:
a foot rest member, having a first end and a second end, the foot rest member coupled at the first end via at least one pivotable connection to a foot rest frame member, the foot rest frame member attachable to the vehicle frame;
   wherein the foot rest member is pivotably, displaceable from a first position to a second position, where the second end of the foot rest member travels through a defined arc measured with respect to a longitudinal axis of the vehicle frame when the second end transits from the first position to the second position;
a biasing member that biases the foot rest member about the at least one pivotable connection from the first position to the second position;
a remotely actuated retention mechanism that includes an actuator disposed remote from the foot rest member and which maintains the foot rest member in the first position and, when remotely actuated using the actuator, releases the foot rest member from the first position; and
a brace member having a first end and a second end, the first end of the brace member pivotably coupled via at least one pivotable brace connection to a motor-driven vehicle frame component and the second end of the brace member pivotably coupled to the foot rest frame member,
   wherein the brace member maintains the foot rest member in at least one of the first position or the second position.

24. A foot rest system for use with a motor-driven vehicle, comprising:
a foot rest member, having a first end and a second end, the foot rest member coupled at the first end via at least one pivotable connection to a motor-driven vehicle frame component;
   wherein the foot rest member is pivotably displaceable from a first position to a second position, where the second end of the foot rest member travels through a defined arc measured with respect to a longitudinal axis of the motor-driven vehicle frame component when the second end transits from the first position to the second position;
a biasing member that biases the foot rest member about the at least one pivotable connection from the first position to the second position; and
a remotely actuated retention mechanism that includes an actuator disposed remote from the foot rest member and which maintains the foot rest member in the first position and, when remotely actuated using the actuator, releases the foot rest member from the first position so that a biasing force of the biasing member causes the foot rest member to pivot about the at least one pivotable connection.

25. The foot rest system of claim 24, further comprising:
a brace member having a first end and a second end;
   wherein the first end of the brace member is pivotably coupled via at least one pivotable brace connection to the motor-driven vehicle frame component; and
   wherein the brace member maintains the foot rest member in at least one of the first position or the second position.

\* \* \* \* \*